(12) United States Patent
Kawajiri et al.

(10) Patent No.: US 11,248,569 B2
(45) Date of Patent: Feb. 15, 2022

(54) FUEL SUPPLY DEVICE

(71) Applicant: DENSO CORPORATION, Kariya (JP)

(72) Inventors: Chiaki Kawajiri, Kariya (JP); Tetsurou Okazono, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/012,542

(22) Filed: Sep. 4, 2020

(65) Prior Publication Data
US 2021/0108600 A1 Apr. 15, 2021

(30) Foreign Application Priority Data
Sep. 5, 2019 (JP) .............................. JP2019-161648

(51) Int. Cl.
| | |
|---|---|
| *F02M 37/50* | (2019.01) |
| *F02M 37/00* | (2006.01) |
| *F02M 37/10* | (2006.01) |
| *F02M 37/44* | (2019.01) |
| *F02M 37/20* | (2006.01) |
| *B01D 36/00* | (2006.01) |
| *F02M 37/54* | (2019.01) |
| *F02M 37/32* | (2019.01) |
| *F02M 37/48* | (2019.01) |

(52) U.S. Cl.
CPC .......... *F02M 37/50* (2019.01); *B01D 36/001* (2013.01); *F02M 37/0023* (2013.01); *F02M 37/10* (2013.01); *F02M 37/20* (2013.01); *F02M 37/44* (2019.01); *F02M 37/54* (2019.01); *F02M 37/0082* (2013.01); *F02M 37/32* (2019.01); *F02M 37/48* (2019.01)

(58) Field of Classification Search
CPC ............................... F02M 37/20; F02M 37/54
See application file for complete search history.

(56) References Cited

U.S. PATENT DOCUMENTS

| | | | | |
|---|---|---|---|---|
| 4,279,232 A | * | 7/1981 | Schuster ................ | F02M 37/20 123/461 |
| 5,584,988 A | * | 12/1996 | Hashimoto ............ | B01D 29/15 210/136 |
| 5,728,292 A | * | 3/1998 | Hashimoto ............ | B01D 29/15 210/136 |

(Continued)

FOREIGN PATENT DOCUMENTS

JP   2012-132365   7/2012

*Primary Examiner* — Kevin R Steckbauer
(74) *Attorney, Agent, or Firm* — Nixon & Vanderhye P.C.

(57) ABSTRACT

A fuel supply device includes a filter device, a pump, a suction pipe, and a bubble removing device. The filter device includes a first filter that filters a fuel, a filter chamber surrounded by the first filter, and a filter opening that is in fluid communication with the filter chamber. The pump has a pump suction port for drawing the fuel from the filter chamber. The suction pipe fluidly connects the filter opening to the pump suction port. The bubble removing device is disposed in at least one of the filter device and the suction pipe. The bubble removing device includes a valve device that is configured to discharge a bubble contained in the fuel to the internal space of the fuel tank, and a foreign matter regulator that is disposed between the valve device and the internal space and that regulates or prevents a foreign matter contained in the fuel from flowing into the fuel supply device.

6 Claims, 9 Drawing Sheets

(56) References Cited

U.S. PATENT DOCUMENTS

| | | | | |
|---|---|---|---|---|
| 5,730,106 | A * | 3/1998 | Gonzalez | F02M 37/0047 |
| | | | | 123/516 |
| 6,299,723 | B1 * | 10/2001 | Seto | B01D 19/0031 |
| | | | | 134/110 |
| 7,210,465 | B2 * | 5/2007 | Ikeya | F02M 37/106 |
| | | | | 123/510 |
| 10,926,207 | B2 * | 2/2021 | Kitajima | B01D 19/0057 |
| 10,934,012 | B2 * | 3/2021 | Otradovec | B64D 37/34 |
| 2005/0274361 | A1 * | 12/2005 | Ikeya | F02M 37/025 |
| | | | | 123/457 |
| 2011/0139278 | A1 * | 6/2011 | Kawajiri | B01D 35/0273 |
| | | | | 137/565.01 |
| 2019/0091614 | A1 * | 3/2019 | Kitajima | B01D 35/0276 |
| 2019/0375513 | A1 * | 12/2019 | Otradovec | F02M 37/22 |

* cited by examiner

FUEL SUPPLY DEVICE

CROSS REFERENCE TO RELATED APPLICATIONS

This application is based on Japanese Patent Application No. 2019-161648 filed on Sep. 5, 2019, the disclosure of which is incorporated herein by reference.

TECHNICAL FIELD

The present disclosure relates to a fuel supply device.

BACKGROUND

A fuel supply device is a device that filters foreign matters with a filter device and pumps out fuel in the fuel tank with a pump. In such a fuel supply device, a valve device that fluidly connect between the inside and the outside of the filter device is opened during a valve opening operation to discharge bubbles in the filter device to an outside.

SUMMARY

According to one aspect of the present disclosure, a fuel supply device is provided. A fuel supply device includes a filter device, a pump, a suction pipe, and a bubble removing device. The filter device includes a first filter that filters a fuel, a filter chamber surrounded by the first filter, and a filter opening that is in fluid communication with the filter chamber. The pump has a pump suction port for drawing the fuel from the filter chamber. The suction pipe fluidly connects the filter opening to the pump suction port. The bubble removing device is disposed in at least one of the filter device and the suction pipe. The bubble removing device includes a valve device that is configured to discharge a bubble contained in the fuel to the internal space of the fuel tank, and a foreign matter regulator that is disposed between the valve device and the internal space and that regulates or prevents a foreign matter contained in the fuel from flowing into the fuel supply device.

DETAILED DESCRIPTION

In a typical fuel supply device, for a valve device that is configured to fluidly connect between the inside and the outside of a filter device when the valve is open, fuel containing foreign matters may flow into the filter device through the valve device.

Therefore, according to the above-described aspect of the present disclosure, a bubble removing device having a foreign matter regulator is disposed in at least one of the filter device and a suction pipe. The bubble removing device is configured to regulate or prevent a foreign matter contained in the fuel from flowing into the fuel supply device by the foreign matter regulator. Therefore, it is possible to inhibit or prevent fuel containing unfiltered foreign matters FO from entering while discharging bubbles to an outside of the filter device.

Next, a plurality of embodiments of the present disclosure will be described in detail below.

A: FIRST EMBODIMENT

Figure 1:
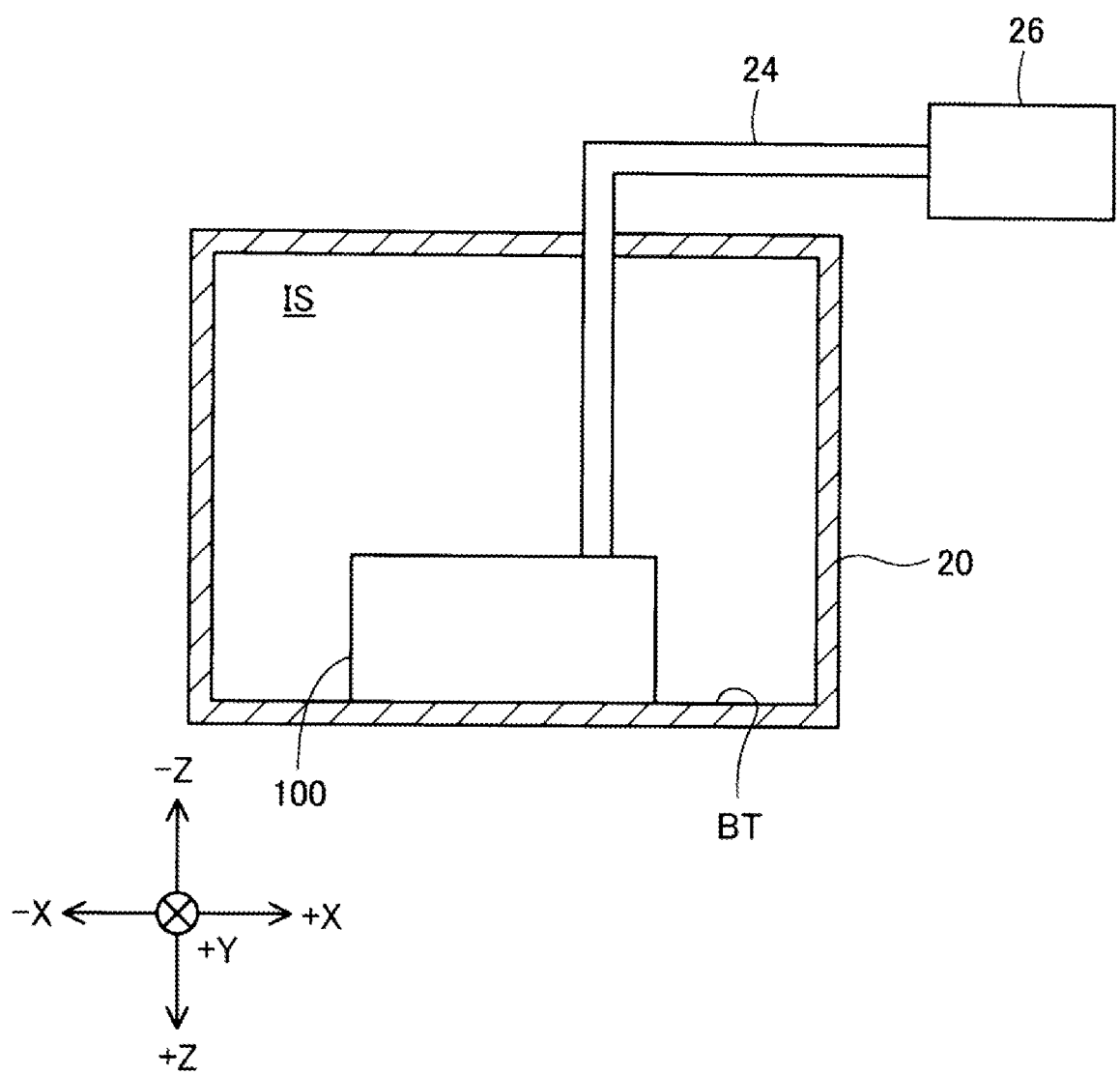
FIG. 1 is an explanatory diagram showing a layout of a fuel supply device.

As shown in FIG. 1, a fuel supply device 100 of the present embodiment is disposed in an internal space IS of a fuel tank 20 that is installed in a moving body such as a vehicle. The fuel supply device 100 is connected to an engine 26 via a fuel supply pipe 24 and supplies a fuel in the fuel tank 20 to the engine 26. FIG. 1 shows X-axis, Y-axis, and Z-axis that are orthogonal to each other. The Z-axis is parallel to the direction of gravity and the XY plane is parallel to a horizontal plane. As shown in FIG. 1, the fuel tank 20 is installed in the vehicle so that a bottom BT of the fuel tank 20 is in parallel with the XY plane, that is, the horizontal plane. The +Z direction coincides with the direction of gravity. Hereinafter, the +Z direction may be also referred to as a lower side, and the −Z direction may be also referred to as an upper side. The illustrated XYZ directions are common to each figure, and when specifying the direction, a positive or negative sign is used. That is, the positive direction is represented by adding "+" and the negative direction is represented by adding "−".

Figure 2:
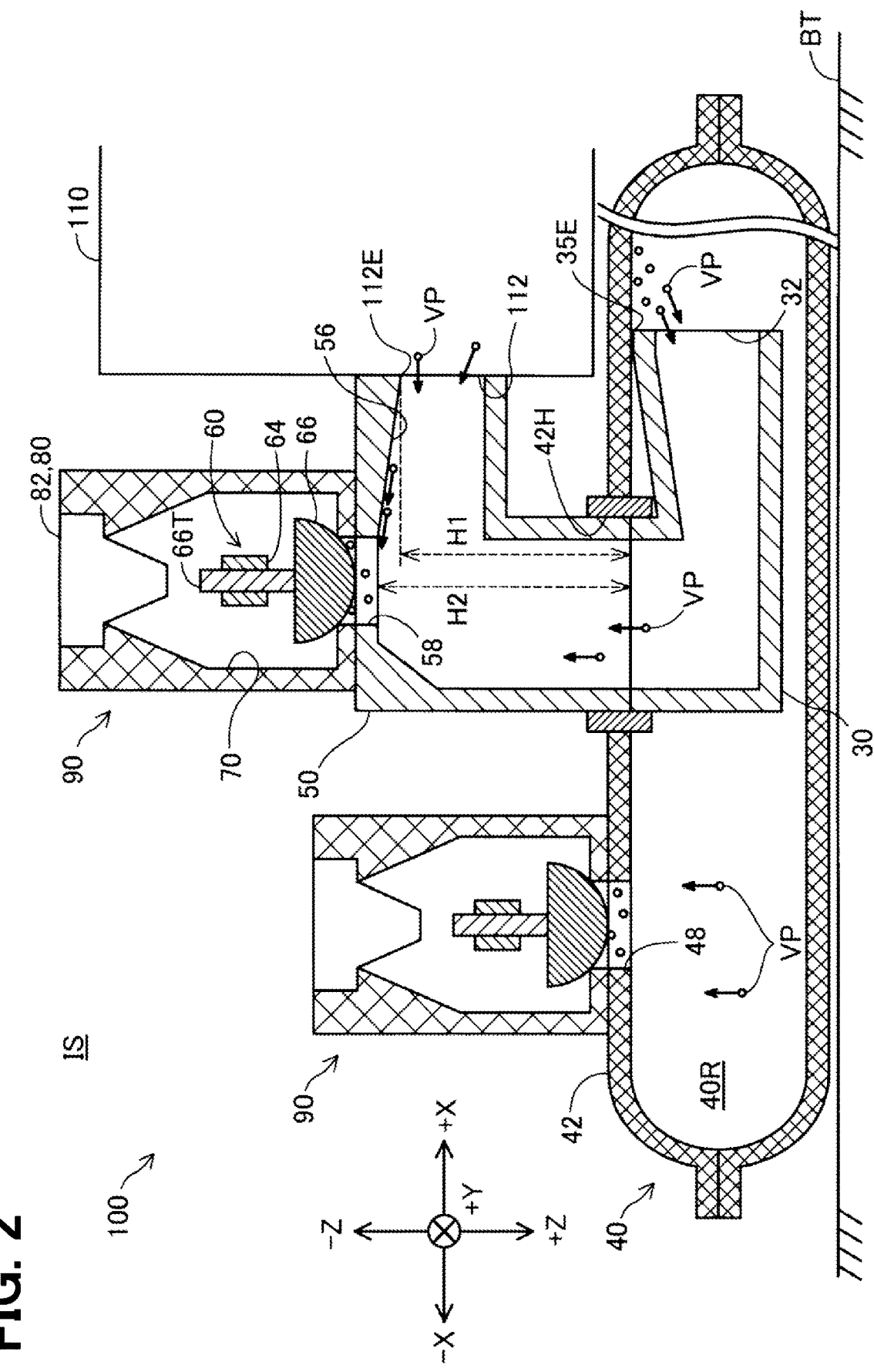
FIG. 2 is a cross-sectional view showing an internal structure of the fuel supply device according to a first embodiment.

FIG. 2 schematically shows an example of the fuel supply device 100 disposed on the bottom BT of the fuel tank 20. As shown in FIG. 2, the fuel supply device 100 of the present embodiment includes a filter device 40, a suction pipe 50, two bubble removing devices 90, and a pump 110. The filter device 40 includes a first filter member 42 and a filter chamber pipe 30.

The first filter member 42 is a non-woven fabric made of resin fibers and is configured to filter fuel when the fuel is passing therethrough. For the first filter member 42, two non-woven fabrics each having a substantially rectangular shape in an XY-plan view are used. The first filter member 42 is formed by welding peripheral portions of the two non-woven fabrics so that a filter chamber 40R is formed between the two non-woven fabrics that face each other. A first opening 48 and a filter opening 42H are formed on an upper surface of the first filter member 42.

The filter chamber pipe 30 is a pipe disposed in the filter chamber 40R. The filter chamber pipe 30 has a shape extending along the horizontal direction from a suction port 32 that in fluid communication with the filter chamber 40R and being bent upward toward the filter opening 42H.

As shown in FIG. 2, in the filter chamber pipe 30, an upper end 35E at the suction port 32 is in contact with an upper wall surface in the filter chamber 40R. An upper end of the suction port 32 is positioned at the vicinity of the upper wall surface in the filter chamber 40R. As a result, bubbles around an upper side of the filter chamber 40R are effectively guided into the filter chamber pipe 30 from the upper end of the suction port 32.

The suction pipe 50 is a pipe connecting the filter device 40 and the pump 110. The suction pipe 50 is connected to the filter chamber pipe 30 through the filter opening 42H. The suction pipe 50 has a shape extending upward from the filter opening 42H and being bent toward the pump 110 located on a lateral side of the suction pipe 50. One end of the suction pipe 50 opposite to the other end connected to the filter chamber pipe 30 is connected to a pump suction port 112 of the pump 110. A second opening 58 is formed on an upper wall surface of the suction pipe 50. The second opening 58 may be also referred to as a suction pipe opening 58.

In the present embodiment, an tilted portion 56 is formed on the upper wall surface of the suction pipe line 50. The tilted portion 56 linearly extends to fluidly connect an upper edge 112E of the pump suction port 112 and the second opening 58 located above the upper edge 112E. As shown in FIG. 2, the height H2 from the filter opening 42H to the second opening 58 is greater than the height H1 from the filter opening 42H to the upper edge 112E of the pump suction port 112. That is, the inner wall of the suction pipe 50 from the upper edge 112E of the pump suction port 112 to the second opening 58 inclines toward the second opening 58.

The pump 110 is a Wesco-type pump having an impeller (not shown) in a housing. The pump 110 draws fuel through the pump suction port 112 by a suction force generated by rotation of the impeller. The pump 110 pumps out the sucked fuel to a downstream side, that is, toward a pressure adjusting device 22. The pump 110 may be a trochoidal pump that uses a trochoidal gear instead of the impeller.

The bubble removing devices 90 is configured to discharge bubbles contained in the fuel in the fuel supply device 100 to an outside of the fuel supply device 100, that is, to the internal space IS of the fuel tank 20. One of the bubble removing devices 90 is connected to the first opening 48 of the filter device 40 and the other of the bubble removing devices 90 is connected to the second opening 58 of the suction pipe 50.

The details of the bubble removing devices 90 will be described with reference to FIGS. 2 and 3. In the present embodiment, as shown in FIG. 2, two bubble removing devices 90 are used and disposed in the filter device 40 and the suction pipe 50. The bubble removing devices 90 are different in that they are connected to the first opening 48 or the second opening 58, and the other structures are the same as each other. Hereinafter, the bubble removing device 90 disposed in the suction pipe 50 will be described.

Figure 3:
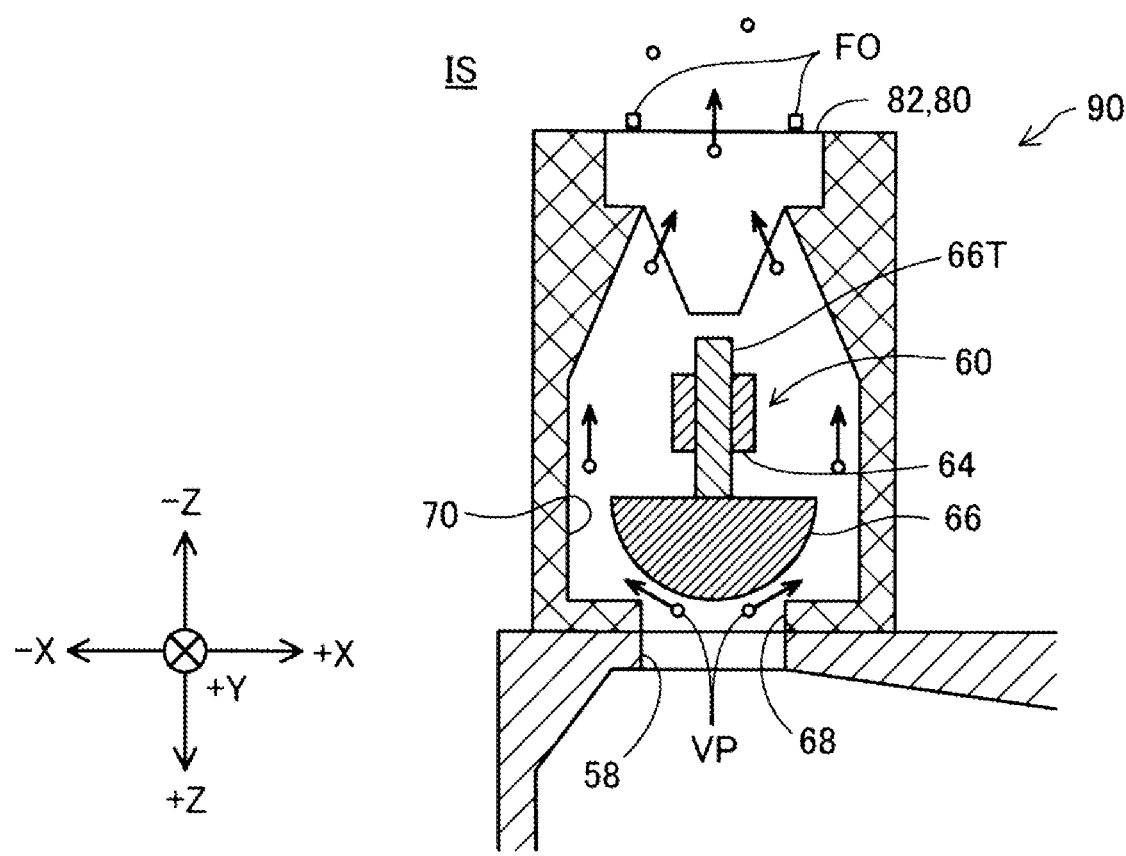
FIG. 3 is a cross-sectional view showing an internal structure of a bubble removing device.

As shown in FIGS. 2 and 3, the bubble removing device 90 includes a valve device 60 and a foreign matter regulator 80 in a communication pipe 70. The communication pipe 70 is a pipe that fluidly connects the second opening 58 of the suction pipe 50 to the internal space IS of the fuel tank 20.

The valve device 60 includes an opening 68 that is in communication with the second opening 58, a valve body 66, and a support portion 64. The valve body 66 is a substantially hemispherical rubber member to which a columnar shaft 66T is connected. The shaft 66T is slidable along the support portion 64. The valve body 66 has a weight to be pushed up to be in a valve opening state by the buoyancy of bubbles accumulated in the opening 68. The valve body 66 closes the opening 68 by sitting on an upper side of the opening 68. The bubble removing device 90 shown in FIG. 2 is in a valve closed state in which the opening 68 is closed by the valve body 66. The valve body 66 may be made of resin as well as rubber, and various valves such as a ball valve, an umbrella valve, and a duck bill valve may be used as the valve body 66.

The foreign matter regulator 80 is configured to regulate or prevent foreign matters contained in the fuel from flowing into the fuel supply device 100. The foreign matter regulator 80 is disposed in the communication pipe 70 at an end side close to the internal space IS, which is above the valve device 60.

In the present embodiment, the foreign matter regulator 80 includes a second filter 82 that captures foreign matter contained in the fuel. The second filter 82 is a so-called in-line type filter in which a nylon non-woven fabric is disposed in a resin case. The second filter 82 may be a filter made of various materials such as paper, synthetic fiber, and metal, and a filter other than the in-line type such as a screen type, a spin-on type, and a magnetic force type may be used as the second filter 82. The second filter 82 may be a filter having a coarser mesh than the first filter unit 42 to the extent that bubbles in the fuel are allowed to flow through the second filter 82 but foreign matters in the fuel are captured by the second filter 82.

FIGS. 2 and 3 schematically show bubbles VP contained in the fuel. For example, when the fuel is drawn by the pump 110, the pressure of the fuel in the filter device 40 may decrease to be lower than the pressure of the fuel outside of the filter device 40. When the pressure of the fuel in the filter device 40 decreases to be lower than the vapor pressure of the fuel, bubbles VP may generate. As shown in FIG. 2, the bubbles VP rises in the fuel due to buoyancy and moves upward toward the upper wall surface of the filter chamber 40R or the upper wall surface of the suction pipe 50. The first opening 48 serves as a space for collecting the bubbles VP at the upper wall surface of the filter chamber 40R, and the second opening 58 serves as a space for collecting the bubbles VP at the upper wall surface of the suction pipe 50.

When the bubbles VP accumulate in the opening 68 and adhere to the valve body 66, the buoyancy applied to the valve body 66 increases. As shown in FIG. 3, when the valve body 66 is pushed up by the buoyancy of the bubbles VP accumulated in the opening 68 through the second opening 58, the bubble removing device 90 is configured to allow the communication pipe 70 to be in fluid communication with the suction pipe 50, that is the bubble removing device 90 is in the valve opening state. When the bubble removing device 90 is in the valve opening state, the bubbles VP pass through the valve device 60, rise in the communication pipe 70, and reach the second filter 82.

FIG. 3 schematically shows the foreign matters FO in the fuel. As shown in FIG. 3, the foreign matters FO are captured by the second filter 82, but the bubbles VP pass through the second filter 82 and are discharged to the internal space IS of the fuel tank 20.

As described above, according to the fuel supply device 100 of the present embodiment, the bubble removing devices 90 each having the foreign matter regulator 80 is disposed in the filter device 40 and the suction pipe line 50. The bubble removing device 90 is configured to suppress the foreign matters FO contained in the fuel to flow into the fuel supply device 100 by the foreign matter regulator 80. Therefore, it is possible to prevent the fuel containing unfiltered foreign matters FO from entering the fuel supply device 100 while discharging bubbles to an outside of the filter device 40.

According to the fuel supply device 100 of the present embodiment, the foreign matter regulator 80 includes the second filter 82. Therefore, the bubble removing device 90 can be made compact. The foreign matter suppression unit 80 can be easily replaced.

According to the fuel supply device 100 of the present embodiment, the upper wall surface of the suction pipe 50 from the upper edge 112E of the pump suction portion 112 to the second opening 58 inclines toward the second opening 58 by the tilted portion 56. When coming into contact with the inclined portion 56, the bubbles VP are guided along the inclined portion 56 to the second opening 58. Therefore, it is possible to prevent the bubbles VP flowing through the suction pipe 50 from reaching the pump suction port 112. For example, even if the bubbles VP in the pump 110 flow back toward the suction pipe 50 through the pump suction port 112, the bubbles VP are easily guided to the second opening 58 by the inclined portion 56. Thus, discharge of the bubbles VP from the fuel supply device 10 by the bubble removing device 90 can be easily made.

B: SECOND EMBODIMENT

Figure 4:
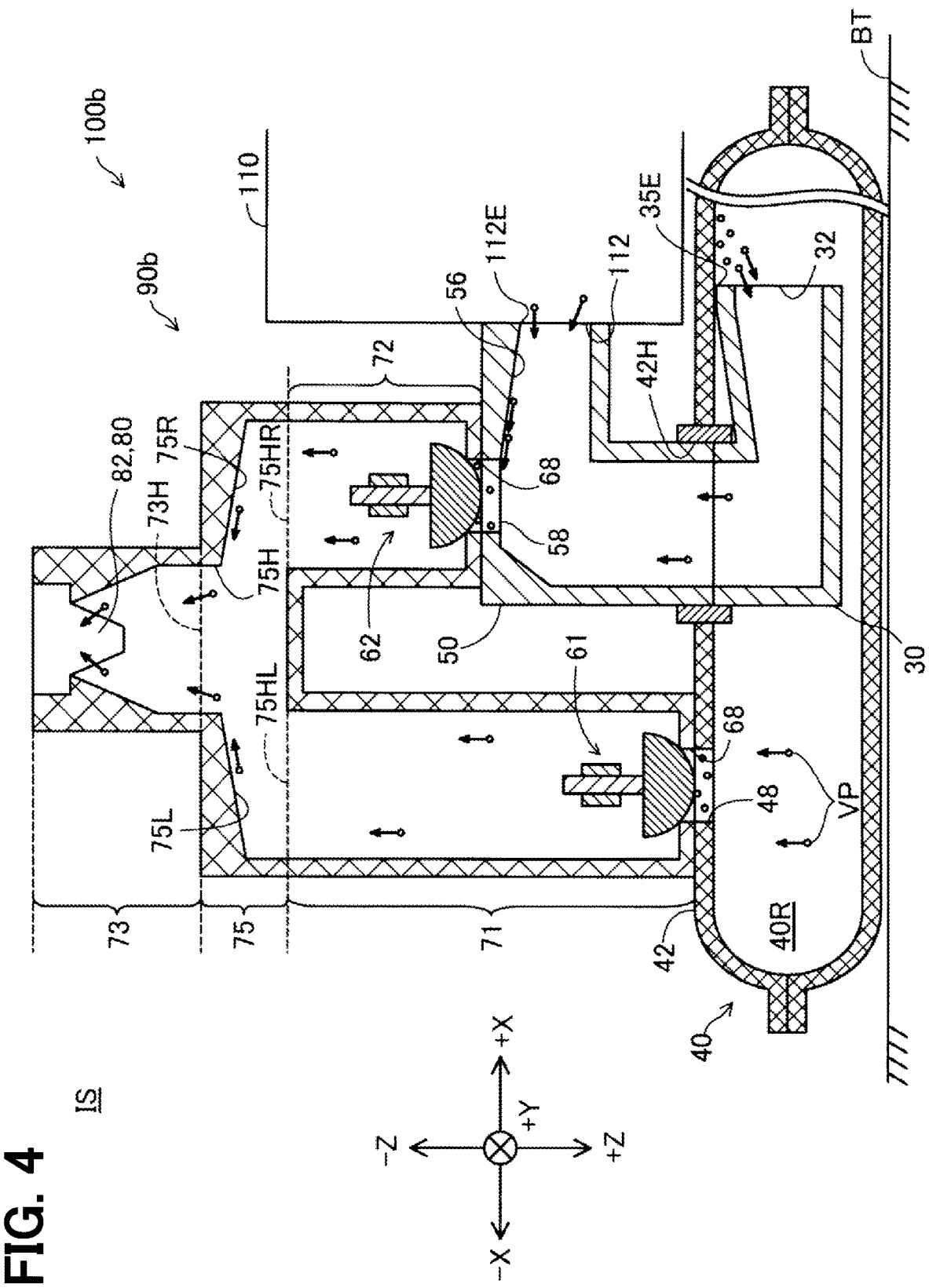
FIG. 4 is a cross-sectional view showing an internal structure of a fuel supply device according to a second embodiment.

As shown in FIG. 4, a fuel supply device 100b of a second embodiment includes a bubble removing device 90b with a flow path structure different from that of the bubble removing device 90. More specifically, the fuel supply device 100b is different from the fuel supply device 100 of the first embodiment in that the fuel supply device 100b includes a single bubble removing device 90b instead of the two bubble removing devices 90. The other configurations are the same as the fuel supply device 100 of the first embodiment. In the present embodiment, the bubble removing device 90b includes a first communication pipe 71, a second communication pipe 72, a third communication pipe 73, a common communication pipe 75, a first valve portion 61, and a second valve portion 62, and a foreign matter regulator 80.

The first communication pipe 71 is a pipe that is disposed above the first filter 42 and extends along the Z direction. The first valve portion 61 is disposed at a lower end of the first communication pipe 71. The configurations of the first valve portion 61 are the same as those of the valve device 60 in the first embodiment. The opening 68 of the first valve portion 61 is in fluid communication with the first opening 48 of the first filter 42. When the first valve 61 is in a valve opening state, the first communication pipe 71 and the filter chamber 40R are in fluid communication with each other.

The second communication pipe 72 is a pipe that is disposed above the suction pipe 50 and extends along the Z direction. The second valve portion 62 is disposed at a lower end of the second communication pipe 72. The configurations of the second valve 62 are the same as those of the valve device 60 in the first embodiment. The opening 68 of the second valve portion 62 is in fluid communication with the second opening 58 of the suction pipe 50. When the second valve 62 is in a valve opening state, the second communication pipe 72 and the suction pipe 50 are brought in fluid communication with each other.

The common communication pipe 75 is a pipe along the horizontal direction and has two openings 75HL and 75HR on a lower wall surface on both end sides in the X direction. The openings 75HL and 75HR of the common communication pipe 75 are fluidly connected to an upper end side of the first communication pipe 71 and an upper end side of the second communication pipe 72, respectively. An opening 75H is formed on an upper wall surface of the common communication pipe 75. The opening 75H is located at the center of the upper wall surface of the common communication pipe 75. The upper wall surface of the common communication pipe 75 includes a tilted portion 75L located above the first communication pipe 71 and a tilted portion 75R located above the second communicating pipe 72. The tilted portions 75L and 75R incline toward the opening 75H.

The third communication pipe 73 is a pipe that is disposed above the common communication pipe 75 and extends along the Z direction. An opening 73H on a lower end side of the third communication pipe 73 is fluidly connected to the opening 75H of the common communication pipe. A foreign matter regulator 80 is disposed on the upper end side of the third communication pipe 73. The third communication pipe 73 is in fluid communication with the internal space IS of the fuel tank 20 via the foreign matter regulator 80. In the present embodiment, the foreign matter regulator 80 is formed of a second filter 82 and has the same configuration as that of the foreign matter regulator 80 in the first embodiment.

When the first valve portion 61 is in the valve opening state, the bubbles VP accumulated in the first opening 48 pass through the first valve portion 61, rise in the first communication pipe 71 to the common communication pipe 75, and are led to the opening 75H along the tilted portion 75L. When the second valve 62 is in the valve opening state, the bubbles VP accumulated in the second opening 58 pass through the second valve 62, rise in the second communication pipe 72 to the common communication pipe 75, and are led to the opening 75H along the tilted portion 75R. That is, the bubbles VP flowing through the first communication pipe 71 and the second communication pipe 72 merge at the common communication pipe 75 and reach the third communication pipe 73 through the opening 75H. The bubbles VP that have reached the third communication pipe 73 rise in the third communication pipe 73, pass through the second filter 82, and are discharged to the internal space IS of the fuel tank 20.

As described above, according to the fuel supply device 100b of the present embodiment, the bubble removing device 90b has the first communication pipe 71 in fluid communication with the filter device 40 and the second communication pipe 72 in fluid communication with the suction pipe 50. The first communication pipe 71 and the second communication pipe 72 are fluidly connected to the third communication pipe 73 having the foreign matter regulator 80 via the common communication pipe 75. Therefore, the bubbles VP can be guided into the bubble removing device 90b from both the filter device 40 and the suction pipe 50 while suppressing increase in the number of parts by using the single foreign matter regulator 80.

C: THIRD EMBODIMENT

Figure 5:
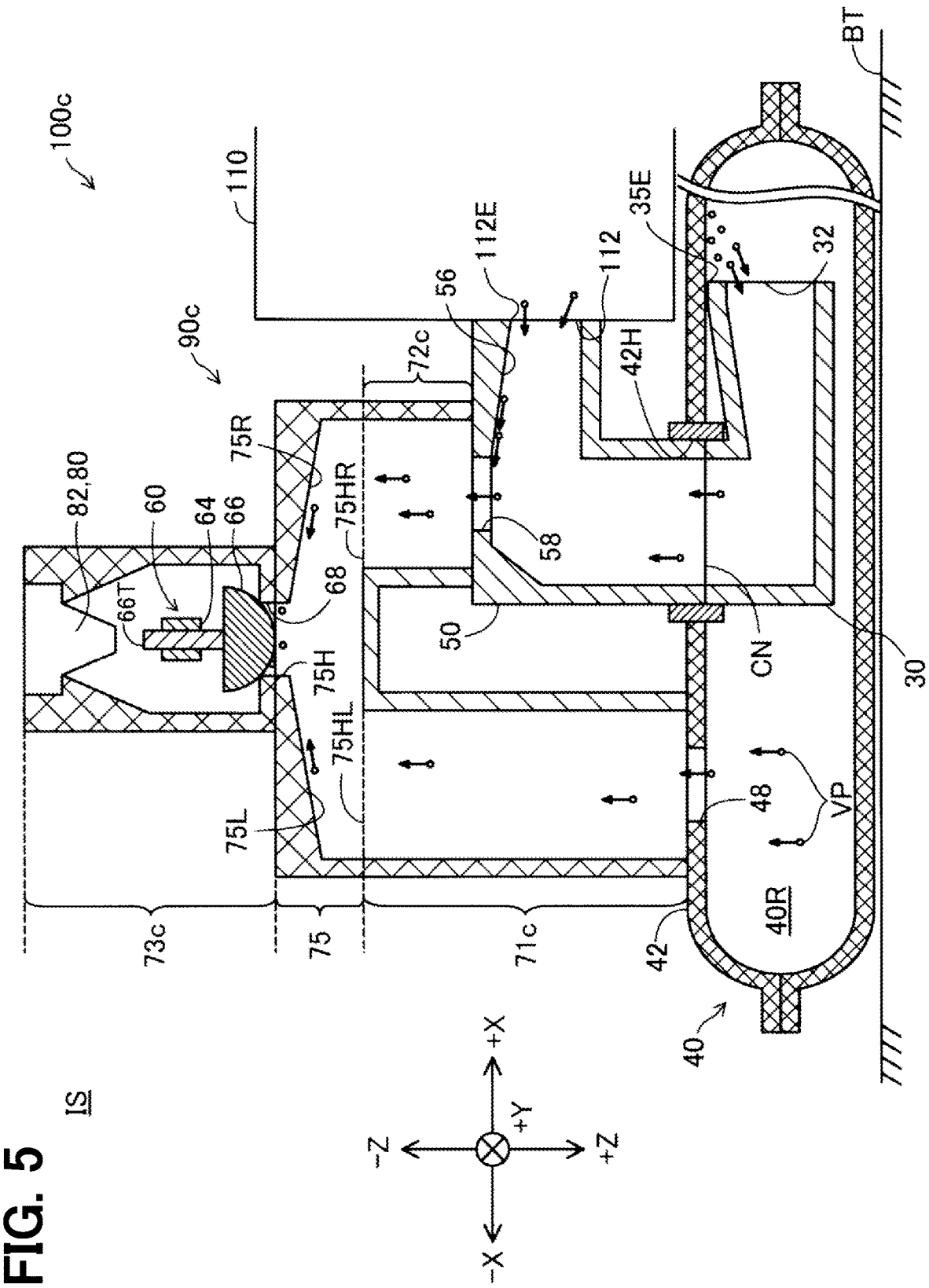
FIG. 5 is a cross-sectional view showing an internal structure of a fuel supply device according to a third embodiment.

As shown in FIG. 5, a fuel supply device 100c of a third embodiment includes a bubble removing device 90c with a flow path structure different from that of the bubble removing device 90. More specifically, the fuel supply device 100c is different from the fuel supply device 100 of the first embodiment in that the fuel supply device 100c includes a single bubble removing device 90c instead of the two bubble removing devices 90. The other configurations are the same as the fuel supply device 100 of the first embodiment. In the present embodiment, the bubble removing device 90c includes a first communication pipe 71c, a second communication pipe 72c, a third communication pipe 73c, a common communication pipe 75, a valve device 60, and a foreign matter regulator 80. The common communication pipe 75 is the same as the common communication pipe 75 in the second embodiment.

The first communication pipe 71c is different from the first communication pipe 71 in the second embodiment in that the first valve portion 61 is not used, and the other configurations are the same as the first communication pipe 71 in the second embodiment. The second communication pipe 72c is different from the second communication pipe 72 in the second embodiment in that the second valve portion 62 is not used, and the other configurations are the same as the second communication pipe 72 in the second embodiment. The bubbles VP in the filter device 40 enter the first communication pipe 71c through the first opening 48, and the bubbles VP in the suction pipe 50 enter the second communication pipe 72 through the second opening 58 . . . .

The third communication pipe 73c is different from the third communication pipe 73 in the second embodiment in that the valve device 60 is used. The configuration of the valve device 60 is different from the valve device 60 in the first embodiment in that the opening 68 is fluidly connected to the opening 75H of the common communication pipe 75, and the other configurations are the same as the valve device 60 in the first embodiment. The bubbles VP that have passed through the communication pipes 71c and 72c and reached the common communication pipe 75 are guided to the opening 75H along the tilted portions 75L and 75R. The bubbles VP accumulated in the opening 75H and the opening 68 cause the valve device 60 to open by buoyancy and enter the third communication pipe 73. The bubbles VP rise in the third communication pipe 73, pass through the second filter 82, and are discharged to the internal space IS of the fuel tank 20.

As described above, according to the fuel supply device 100c of the present embodiment, the bubble removing device 90c has the first communication pipe 71c in fluid communication with the filter device 40 and the second communication pipe 72c in fluid communication with the suction pipe 50. The first communication pipe 71c and the second communication pipe 72c are fluidly connected to the third communication pipe 73c having the valve device 60 and the foreign matter regulator 80 via the common communication pipe 75. Therefore, the bubbles VP can be guided into the bubble removing device 90c from both the filter device 40 and the suction pipe line 50 while suppressing increase in the number of parts by using the single bubble removing device 90c.

D: FOURTH EMBODIMENT

Figure 6:
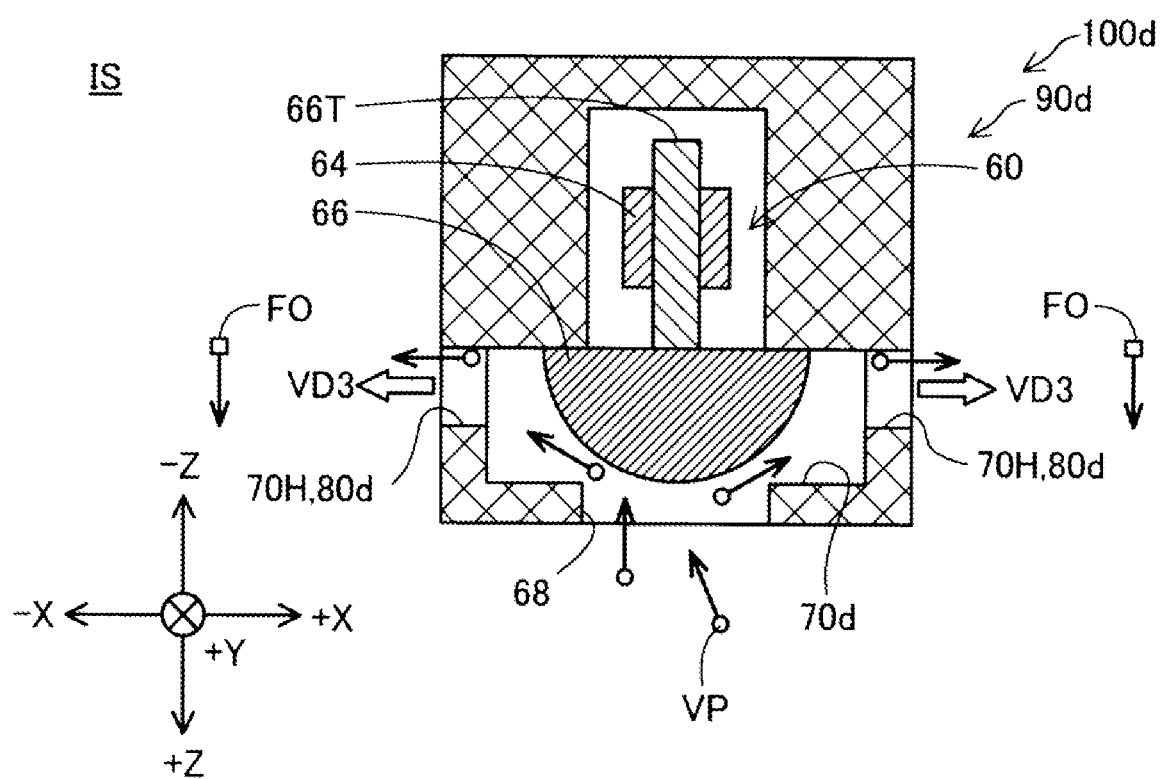
FIG. 6 is an explanatory diagram showing a bubble removing device in a valve opening state according to a fourth embodiment.

As shown in FIG. 6, the fuel supply device 100d according to a fourth embodiment is different from the fuel supply device 100 of the first embodiment in that the fuel supply device 100d includes a bubble removing device 90d without the second filter 82 instead of the bubble removing device 90. The other configurations are the same as the fuel supply device 100 of the first embodiment. Since the bubble removing device 90d is disposed in each of the filter device 40 and the suction pipe 50 as in the first embodiment, the illustration of the layout of the bubble removing devices 90d is omitted. However, the bubble removing device 90d may be disposed only in either the filter device 40 or the suction pipe 50.

As shown in FIG. 6, the bubble removing device 90d includes a valve device 60, a communication pipe 70d, and a foreign matter regulator 80d. The communication pipe 70d is a pipe that fluidly connects an opening 68 of the valve device 60 to the internal space IS of the fuel tank 20. The configurations of the valve device 60 are the same as those of the valve device 60 in the first embodiment. The valve device 60 shown in FIG. 6 is in a valve opening state.

In the present embodiment, the foreign matter regulator 80d is configured by using discharge ports 70H formed in the communication pipe 70d instead of using the second filter 82. More specifically, the discharge ports 70H are capable of discharging the bubbles VP and are configured to suppress or prevent foreign matters FO contained in the fuel from flowing into the bubble removing device 90d. That is, the discharge ports 70H serve as a foreign matter regulator 80d.

Each of the discharge ports 70H is a through hole that passes through the wall of the bubble removing device 90d in the horizontal direction and fluidly connects the communication pipe 70d to the internal space IS of the fuel tank 20. In the present embodiment, the bubble removing device 90d includes two discharge ports 70H, one on the +X direction side of the valve body 66 and the other on the −X direction side of the valve body 66. Each of the discharge ports 70H is located above the opening 68 of the valve device 60. The discharge ports 70H are arranged to be line-symmetric with respect to the valve body 66. However, a single discharge port 70H on either the +X direction or the −X direction side may be used.

In the present embodiment, the direction of each of the discharge ports 70H is a direction along the horizontal direction. The "direction of the discharge port 70H" indicates a macroscopic flow direction of the bubbles when the bubbles are discharged through the discharge port 70H. FIG. 6 shows a direction VD3 which is the direction of each of the discharge ports 70H. The bubbles VP guided from the valve device 60 in the valve opening state into the communication pipe 70d rise along the communication pipe 70d and are discharged through the discharge ports 70H to the internal space IS along the directions VD3.

The foreign matters FO contained in the fuel of the internal space IS of the fuel tank 20 move by, for example, a gravity force due to the weight of the foreign matters FO themselves. In addition, the foreign matters FO move toward the filter device 40 located below the bubble removing device 90d by, for example, the suction force of the pump 110.

According to the fuel supply device of the present embodiment, the foreign matter regulator 80f is disposed as the discharge ports 70H6 open in the horizontal direction. Therefore, it is possible to prevent the foreign matters FO from flowing into the bubble removing device 90d through the discharge ports 70H. Since the bubbles VP are discharged from the discharge ports 70H, it is possible to prevent the foreign matters FO from flowing into the discharge ports 70H by utilizing the bubbles VP.

E: FIFTH EMBODIMENT

Figure 7:
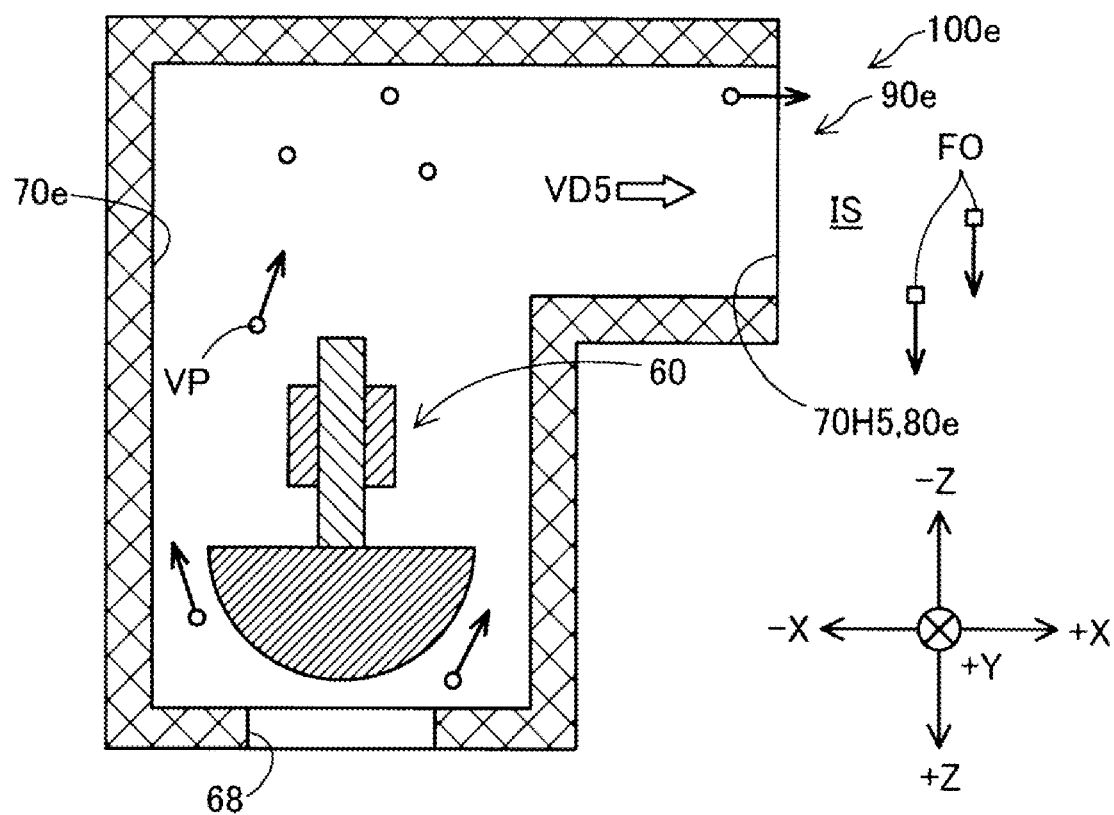
FIG. 7 is an explanatory diagram showing a bubble removing device in a valve opening state according to a fifth embodiment.

As shown in FIG. 7, the fuel supply device 100e according to a fifth embodiment is different from the fuel supply device 100 of the first embodiment in that the fuel supply device 100e includes a bubble removing device 90e without the second filter 82 instead of the bubble removing device 90. Since the bubble removing devices 90e are disposed in the filter device 40 and the suction pipe 50 as in the first embodiment, the illustration of the layout of the bubble removing devices 90*d* is omitted. However, a single bubble removing device 90*e* may be disposed only in either the filter device 40 or the suction pipe 50.

As shown in FIG. 7, the bubble removing device 90*e* includes a valve device 60, a communication pipe 70*e*, and a foreign matter regulator 80*e*. The communication pipe 70*e* is a pipe that fluidly connects an opening 68 of the valve device 60 to the internal space IS of the fuel tank 20. The configurations of the valve device 60 are the same as those of the valve device 60 in the first embodiment. The valve device 60 shown in FIG. 7 is in a valve opening state.

The communication pipe 70*e* has a shape that extends upward from the opening 68 and is bent to extend in the horizontal direction. A discharge port 70H5 is formed at the end of the communication pipe 70*e* opposite to the opening 68. In the present embodiment, the discharge port 70H5 serves as the foreign matter regulator 80*e*. The direction of the discharge port 70H5 is a direction along the horizontal direction. FIG. 7 shows a direction VD5 which is the direction of the discharge port 70H5. The bubbles VP guided from the valve device 60 in the valve opening state into the communication pipe 70*e* rise along the communication pipe 70*e* and are discharged through the discharge port 70H5 to the internal space IS along the direction VD5.

According to the fuel supply device of the present embodiment, the foreign matter regulator 80*e* is disposed as the discharge port 70H5 open in the horizontal direction. Therefore, it is possible to prevent the foreign matters FO from flowing into the bubble removing device 90*e* through the discharge port 70H5. Since the bubbles VP are discharged from the discharge port 70H5, it is possible to prevent the foreign matters FO from flowing into the discharge port 70H5 by utilizing the bubbles VP.

F: SIXTH EMBODIMENT

Figure 8:
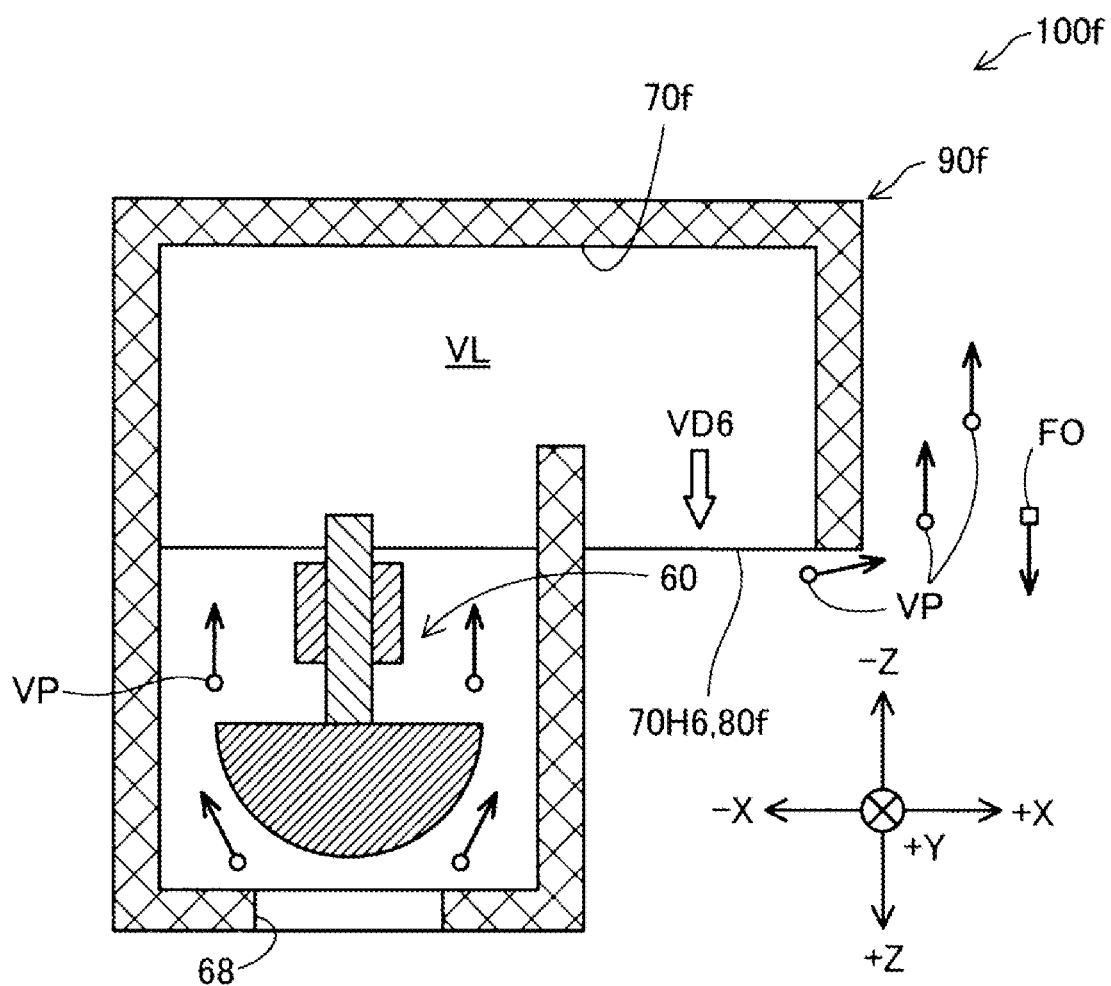
FIG. 8 is an explanatory diagram showing a bubble removing device in a valve opening state according to a sixth embodiment.

As shown in FIG. 8, the fuel supply device according to a sixth embodiment is different from the fuel supply device 100 of the first embodiment in that the fuel supply device includes a bubble removing device 90*f* instead of the bubble removing device 90. The bubble removing devices 90*f* are disposed in the filter device 40 and the suction pipe 50 as in the first embodiment. The arrangement layout of the bubble removing devices 90*f* is not shown. However, the bubble removing device 90*f* may be disposed only in either the filter device 40 or the suction pipe 50.

As shown in FIG. 8, the bubble removing device 90*f* includes a valve device 60, a communication pipe 70*f*, and a foreign matter regulator 80*f*. The configurations of the valve device 60 are the same as those of the valve device 60 in the first embodiment. The valve device 60 shown in FIG. 8 is in a valve opening state. The foreign matter regulator 80*f* is formed as a discharge port 70H6 that is open in the direction of gravity. However, the direction of the discharge port 70H6 may be a direction having a depression angle with respect to the X direction, such as a direction extending diagonally downward, and may be any direction from the horizontal direction to the direction of gravity.

The communication pipe 70*f* is a pipe that fluidly connects an opening 68 of the valve device 60 to the internal space IS of the fuel tank 20. One end side of the communication pipe 70*f* is in fluid communication with an opening 68. The communication pipe 70*f* has a shape that extends upward from the opening 68, is bent to extend in the horizontal direction, and then is further bent downward. A discharge port 70H6 is formed at an end of the communication pipe 70*f* opposite to the opening 68 and is in fluid communication with the internal space IS. The discharge port 70H6 is positioned above the valve device 60. FIG. 8 shows a direction VD6 which is an opening direction of the discharge port 70H6. The direction VD6 coincides with the direction of gravity.

The bubbles VP guided from the valve device 60 in the valve opening state into the communication pipe 70*f* rise along the communication pipe 70*f*. Since the direction of the discharge port 70H6 is the direction of gravity, the bubbles VP are accumulated on the upper wall surface of the communication pipe 70*f*. Here, the aggregate of the accumulated bubbles VP is referred to as a bubble body VL. When a lower side of the bubble body VL reaches the discharge port 70H6, the bubbles VP are sequentially discharged through the discharge port 70H6 in the direction VD6 into the internal space IS.

According to the fuel supply device of the present embodiment, the foreign matter regulator 80*f* is disposed as the discharge ports 70H6 open in the direction of gravity. Therefore, it is possible to prevent the foreign matters FO from flowing into the bubble removing device 90*f* through the discharge ports 70H6. Since the bubble body VL formed of the accumulated bubbles VP interferes with the flow of fuel in the bubble removing device 90*f*, it is possible to prevent the foreign matters FO from reaching the valve device 60 through the discharge port 70H6.

Figure 9:
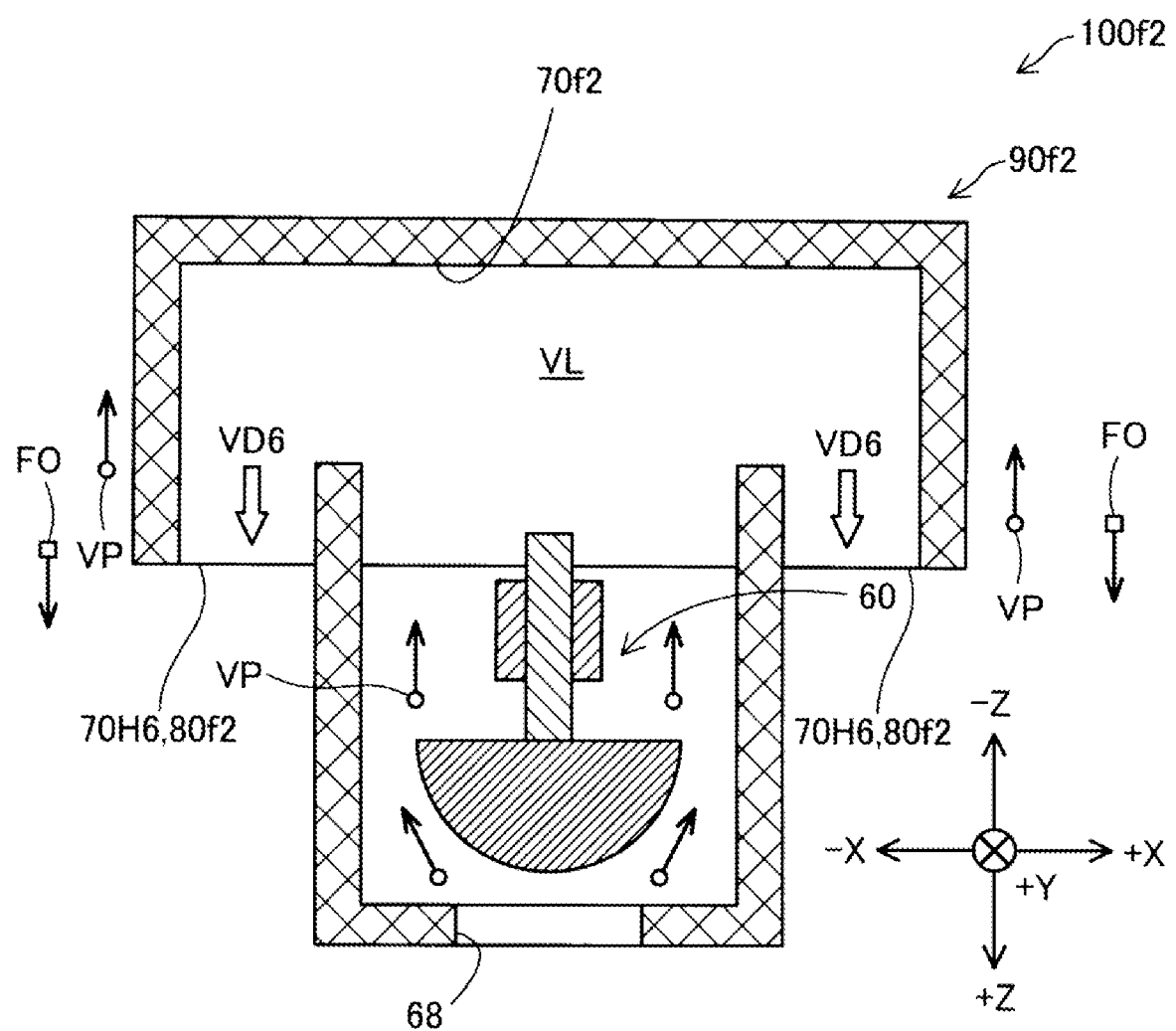
FIG. 9 is an explanatory diagram showing a bubble removing device in a valve opening state according to another embodiment.

G: OTHER EMBODIMENTS (G1) In the sixth embodiment, the communication pipe 70*f* of the bubble removing device 90*f* has the single discharge port 70H6. However, as a bubble removing device 90*f* as shown in FIG. 9, the communication pipe 70*f* may have a shape extending upward from the opening 68 and then divided into a plurality of branching pipes along the horizontal direction. Then, each of the plurality of branching pipes may extend downward to have a discharge port 70H6 that is open in the direction of gravity.

(G2) In each of the above embodiments, the suction pipe 50 has a bent shape, but the suction pipe 50 may have another shape such as a distorted shape or a curved shape in addition to the bent shape.

(G3) In each of the above embodiments, the filter chamber 40R is provided with the filter chamber pipe 30. Alternatively, the filter chamber 40R may not be provided with the filter chamber pipe 30, and the filter chamber 40R and the suction pipe 50 may be directly connected to each other via the filter opening 42H.

(G4) In the above-described first embodiment, two bubble removing devices 90 are used and disposed in the filter device 40 and the suction pipe 50. Alternatively, a bubble removing device 90*f* may be disposed only in either the filter device 40 or the suction pipe 50. The number of the bubble removing devices 90 is not limited to one or two, and may be three or more, and an arbitrary number of bubble removing devices 90 may be disposed in at least one of the filter device 40 and the suction pipe line 50 . . . .

(G5) In each of the above embodiments, the suction pipe 50 is provided with the tilted portion 56, but the upper wall surface of the suction pipe 50 may be a wall surface that is in parallel with the horizontal direction or a curved wall surface. That is, the suction pipe 50 may not have the tilted portion 56.

(G6) In each of the above embodiments, the tilted portion 56 is a part of the upper wall surface of the suction pipe 50 and is a tilted plane linearly connecting the upper edge 112E and the second opening 58. Alternatively, the tilted portion 56 may be a member as long as it has a function of guiding the bubbles VP between the pump suction port 112 and the second opening 58. That is, the tilted portion 56 may not necessarily linearly connect between the edge 112E and the second opening 58. For example, the tilted portion 56 may connect between the edge 112E and the second opening 58 in a bent, curved, or distorted shape. The tilted portion 56 may be a curved or distorted surface instead of a flat surface.

The present disclosure should not be limited to the embodiments or modifications described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

The invention claimed is:

1. A fuel supply device, comprising:
a filter device disposed in an internal space of a fuel tank, the filter device including a first filter that filters a fuel, a filter chamber surrounded by the first filter, and a filter opening that is in fluid communication with the filter chamber;
a pump having a pump suction port for drawing the fuel from the filter chamber;
a suction pipe that fluidly connects the filter opening to the pump suction port; and
a bubble removing device that is disposed in at least one of the filter device and the suction pipe, wherein
the bubble removing device includes:
a valve device that is configured to discharge a bubble contained in the fuel to the internal space of the fuel tank; and
a foreign matter regulator that is disposed between the valve device and the internal space and that regulates or prevents a foreign matter contained in the fuel from flowing into the fuel supply device.

2. The fuel supply device according to claim 1, wherein the foreign matter regulator further includes a second filter that captures the foreign matter.

3. The fuel supply device according to claim 1, wherein the foreign matter regulator is a discharge port for the bubble that is open in a direction between a horizontal direction and a gravity direction.

4. The fuel supply device according to claim 1, wherein the bubble removing device is disposed in the suction pipe,
the suction pipe includes a suction pipe opening that is in fluid communication with the bubble removing device, and
the suction pipe has an inner wall that connects between the suction pipe opening and an upper edge of the pump suction port and that inclines toward the suction pipe opening.

5. The fuel supply device according to claim 1, wherein the bubble removing device includes:
a first communication pipe that is in fluid communication with the filter device;
a second communication pipe that is in fluid communication with the suction pipe;
a common communication pipe that is connected to both the first communication pipe and the second communication pipe; and
a third communication pipe that is connected to the common communication pipe and is in fluid communication with the internal space,
the valve device includes a first valve portion disposed in the first communication pipe and a second valve portion disposed in the second communication pipe, and
the foreign matter regulator is disposed in the third communication pipe.

6. The fuel supply device according to claim 1, wherein the bubble removing device includes:
a first communication pipe that is in fluid communication with the filter device;
a second communication pipe that is in fluid communication with the suction pipe;
a common communication pipe that is connected to both the first communication pipe and the second communication pipe; and
a third communication pipe that is connected to the common communication pipe and is in fluid communication with the internal space, and
the valve device and the foreign matter regulator are disposed in the third communication pipe.

* * * * *